March 6, 1956 V. A. RAYBURN 2,737,302
MATERIAL HANDLING APPARATUS
Filed Dec. 16, 1952 4 Sheets-Sheet 1
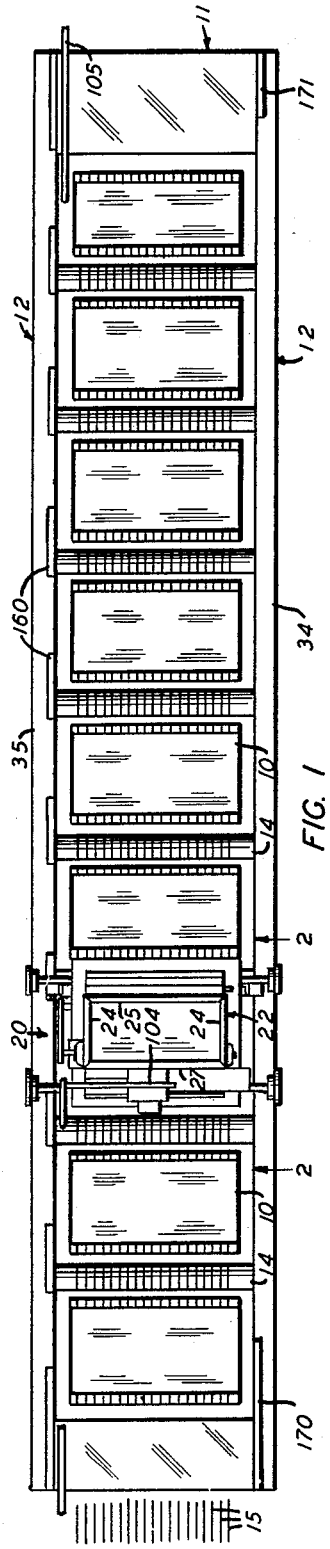
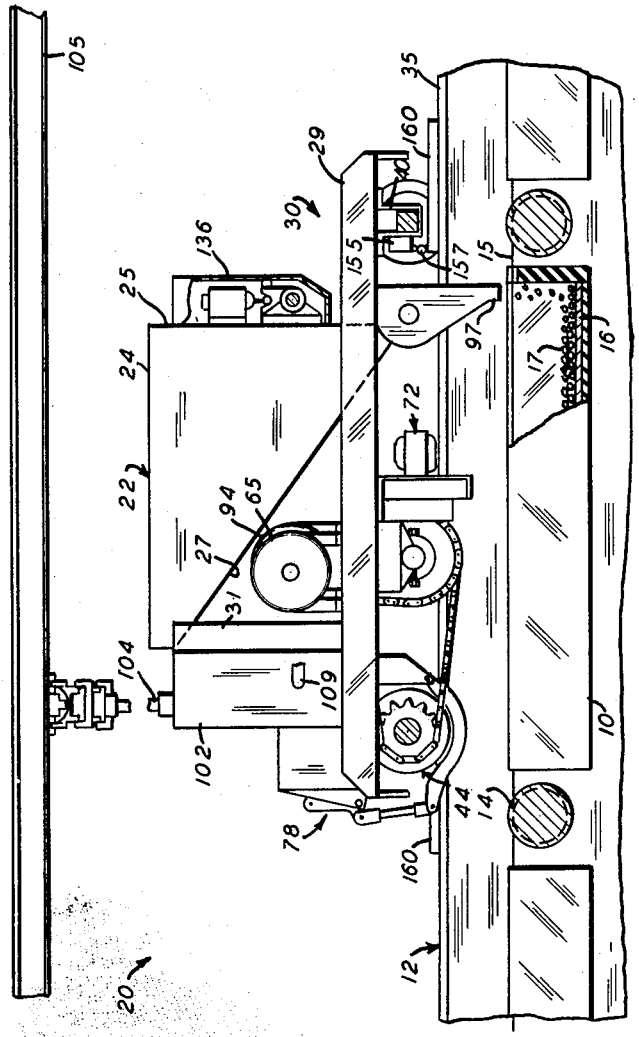
INVENTOR
V. A. RAYBURN
BY
ATTORNEY March 6, 1956

V. A. RAYBURN 2,737,302

MATERIAL HANDLING APPARATUS

Filed Dec. 16, 1952

INVENTOR
V. A. RAYBURN
BY
ATTORNEY

March 6, 1956  V. A. RAYBURN  2,737,302
MATERIAL HANDLING APPARATUS
Filed Dec. 16, 1952  4 Sheets-Sheet 3

INVENTOR
V. A. RAYBURN
BY
ATTORNEY

March 6, 1956  V. A. RAYBURN  2,737,302
MATERIAL HANDLING APPARATUS
Filed Dec. 16, 1952  4 Sheets-Sheet 4

INVENTOR
V. A. RAYBURN
BY *[signature]*
ATTORNEY

United States Patent Office 2,737,302
Patented Mar. 6, 1956

2,737,302

MATERIAL HANDLING APPARATUS

Vincent A. Rayburn, Baltimore, Md., assignor to Western Electric Company, Incorporated, New York, N. Y., a corporation of New York Application December 16, 1952, Serial No. 326,232

5 Claims. (Cl. 214—16)

This invention relates to material handling apparatus, and more particularly to apparatus for conveying, distributing, and uniformly feeding finely divided material over a plurality of individual areas.

An object of this invention is to provide new and improved article handling apparatus.

Another object of the invention is to provide new and improved apparatus for conveying, distributing, and uniformly feeding finely divided material over a plurality of individual areas.

An apparatus illustrating certain features of the invention may include a hopper movable along a given path, and having means for driving the hopper in either direction along the path. A material distributing means is positioned across and under an opening in the hopper and is operable to discharge granular material from the hopper at a substantially uniform rate. A manually operable, hollow, outer shaft is rotatably mounted on the hopper and projects therefrom, and a manually operable inner shaft is mounted rotatably within the outer shaft. Means operatively connected to one of the shafts is selectively actuatable thereby to energize the means to drive the hopper in a selected direction, and means operatively connected to the other shaft is normally selectively actuatable thereby to operate the distributing means.

A complete understanding of the invention may be had from the following detailed description of an apparatus forming a specific embodiment thereof, when read in conjunction with the appended drawings, in which:

Fig. 1 is a plan view of the apparatus mounted in position over a series of electroplating cells;

Fig. 2 is an enlarged, fragmentary, vertical section, partly broken away, taken along line 2—2 of Fig. 1;

Figure 3:
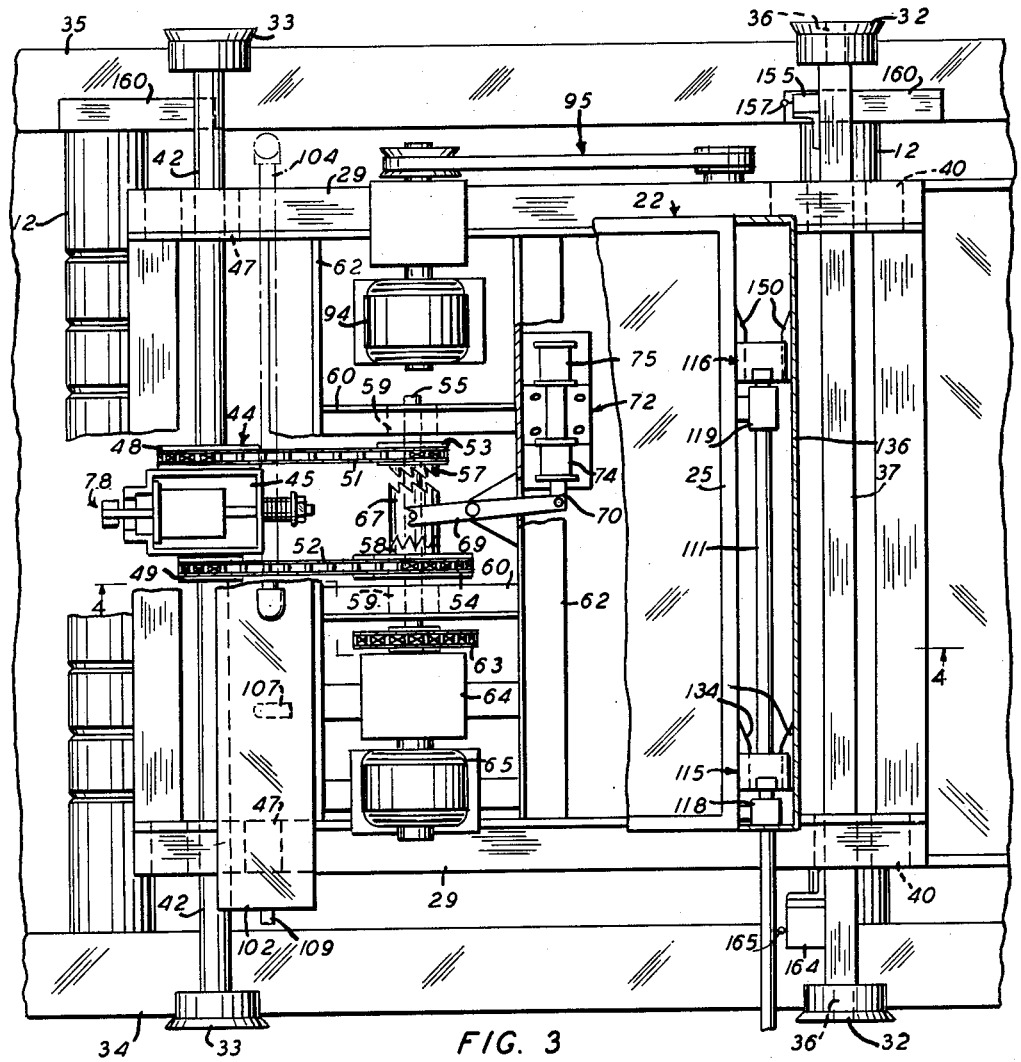
Fig. 3 is an enlarged, fragmentary view of the apparatus shown in Fig. 1, partly broken away.

Referring now to Figs. 1 and 2 of the drawing, a series of aligned, individual copper plating cells 10—10 are shown mounted in a trough-like support structure 11 between two longitudinally extending, horizontally disposed frame members 12—12. Adjacent cells 10—10 are spaced apart from each other to provide for the mounting of transversely disposed, grooved contact rolls 14—14 therebetween. The contact rolls 14—14 are rotatably mounted on bearings (not shown) between the frame members 12—12, and serve as cathodic contacts for applying a negative potential to a plurality of wires 15—15 which are continuously advanced through a suitable electrolyte circulated to and contained in the cells.

On the bottom of each of the cells 10—10 is positioned a rectangular copper plate 16 (Fig. 2), which is covered with a substantially uniform layer 17 of copper shot. A positive potential is applied to the anode plate 16 and thereby to the layer 17 of copper shot, whereby copper ions therefrom enter the electrolyte and metallic copper is deposited electrolytically upon the advancing cathodic wires 15—15.

A manually controlled hopper car for feeding and distributing copper shot to the individual cells 10—10 is shown generally at 20 (Figs. 1 and 2). The hopper car 20 includes a hopper 22 having two vertical side walls 24—24, a vertical front wall 25 and a sloping rear wall 27 which is disposed at an angle slightly greater than 35° above the horizontal. Since the angle of repose of the copper shot is known to be approximately 35°, it is essential that the slope angle of the rear wall 27 be at least 35°, and preferably more, to facilitate the unloading of the hopper 22. The lower edge of the sloping rear wall 27 extends a short distance below the level of the vertical front wall 25 and is spaced therefrom to provide an opening 28 (Fig. 4) extending horizontally across the bottom of the hopper 22, which serves as the outlet for copper shot contained within the hopper. The vertical side walls 24—24 of the hopper are fixedly secured near the bottom thereof to a pair of spaced longitudinal angle frame members 29—29 forming a part of a wheeled carriage 30. Additional support for the hopper 22 is provided by a pair of uprights, one of which designated 31 is shown in Fig. 2.

The carriage 30 is provided with flanged front wheels 32—32 and flanged rear drive wheels 33—33 (Fig. 3) designed for rolling engagement with a pair of parallel, spaced track rails 34 and 35, mounted on the top edge of the frame members 12—12 and extending along the entire series of cells 10—10 on either side.

Figure 4:
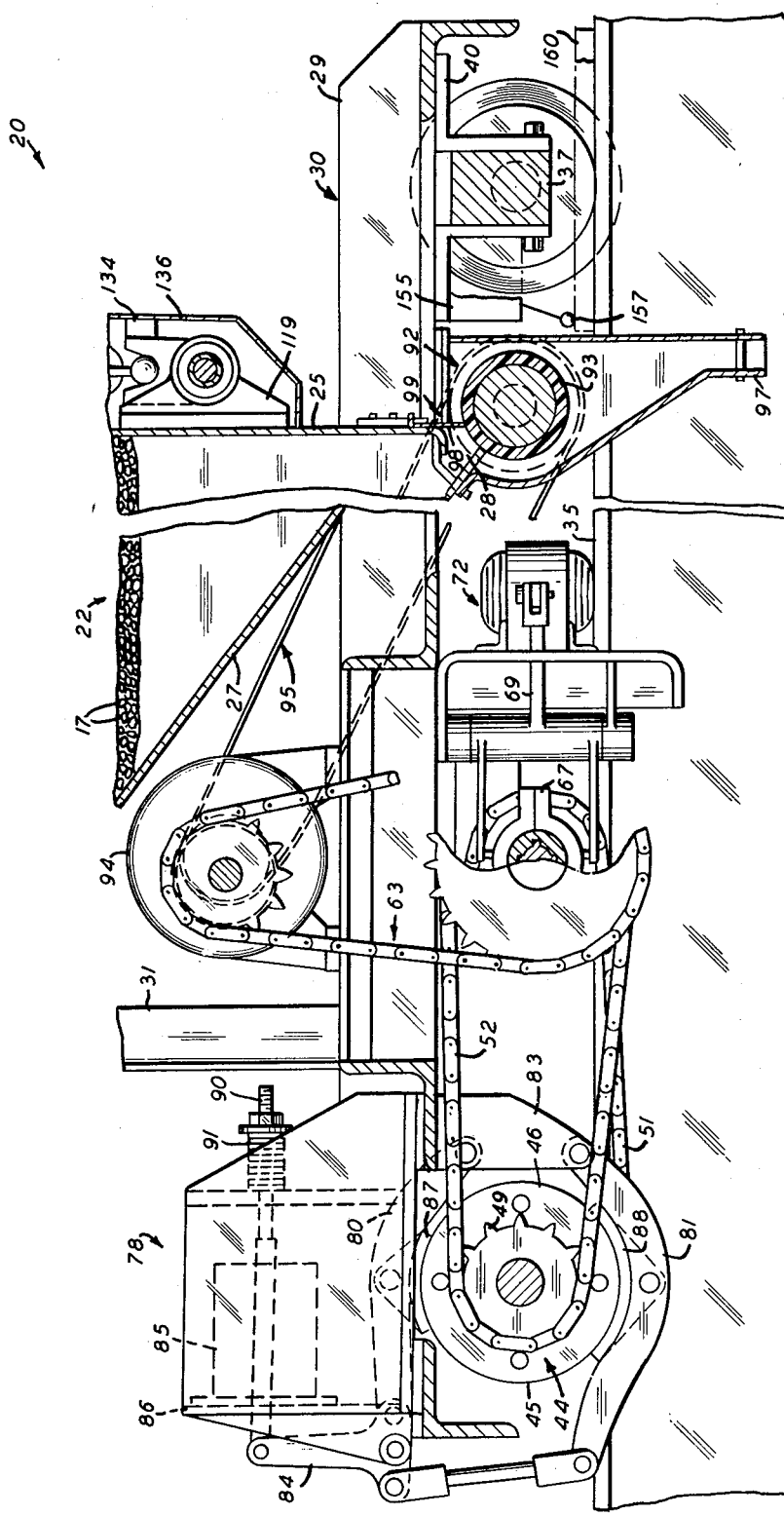
Fig. 4 is an enlarged, fragmentary, vertical section taken along line 4—4 of Fig. 3.

The front wheels 32—32 (Fig. 3) are rotatably mounted on fixed journals 36—36, projecting axially from the opposite ends of a transversely disposed axle 37. The axle 37 is fixedly secured to the angle frame members 29—29 by means of clips 40—40 depending therefrom, and extends beyond the frame members at either side to gage the wheels to the track rails. The rear drive wheels 33—33 are fixedly mounted to the outer ends of rotatable drive shafts 42—42. The inner ends of the drive shafts 42—42 are operatively connected to a conventional differential gear 44 (Figs. 3 and 4). This arrangement prevents yawing and binding of the carriage 30 on the track rails 34 and 35. The differential 44 is contained in a cylindrical casing 45 having a brake drum 46 fixedly secured on its outer surface. The drive shafts 42—42 are rotatably mounted in bearings 47—47 secured to and depending from the frame members 29—29.

Fixedly secured to either side of the cylindrical casing 45 of the differential gear 44, for rotation therewith, are drive sprockets 48 and 49 (Fig. 3), operatively connected by means of drive chains 51 and 52 to drive sprockets 53 and 54, respectively, mounted spacedly on a jack shaft 55. The drive sprockets 53 and 54 are normally freely rotatable on the jack shaft 55, and are provided with fixed clutch elements 57 and 58, respectively, secured to their opposing sides. The jack shaft 55 is rotatably mounted on suitable bearings 59—59 between a pair of longitudinal brackets 60—60 secured to spaced transverse members 62—62 of the carriage 30, and is operatively connected through a chain drive 63 and a gear reduction box 64 to a carriage drive motor 65 suitably mounted on the carriage.

The drive sprockets 53 and 54 are designed to be selectively engaged with the jack shaft 55 by means of a sliding clutch element 67, which is splined to the jack shaft for rotation therewith. The sliding clutch element 67 is movable axially along the jack shaft 55 by means of a pivoted operating arm 69 (Fig. 3) hingedly connected at one end to the sliding clutch element, and at its other end to a solenoid actuated plunger 70 of a push-pull clutch solenoid 72. The push-pull solenoid 72 is of a conventional design, having two separately energizable solenoid pull and push coils 74 and 75, respectively. Energization of the pull coil 74 causes the sliding clutch element 67 to engage the drive sprocket 54, whereas energization of the push coil 75 moves the sliding clutch element into engagement with the drive sprocket 53. When neither of the solenoid coils 74 and 75 is energized, the sliding clutch element 67 occupies a neutral position, wherein it is disengaged from both of the drive sprockets 53 and 54.

The drive ratio of the drive arrangement comprising the sprocket 48 and the drive sprocket 53 is designed to be approximately one-third of that of the drive arrangement comprising the sprocket 49 and the drive sprocket 54. Hence, when the sliding clutch element 67 is in engagement with the fixed clutch element 57 on the sprocket 53, the linear speed of the hopper car 20 along the track rails 35 and 36 will be one-third the linear speed of the car when the sliding clutch element 67 is operatively connected to the drive sprocket 54.

Mounted on the rear of the carriage 30 adjacent to the differential 44 is a solenoid-operated brake assembly shown generally at 78 (Figs. 3 and 4), which includes an upper brake arm 80 and a lower brake arm 81. The brake arms 80 and 81 are generally arcuate in shape and are hingedly connected at their right ends (as viewed in Fig. 4) to a bracket 83 depending from the carriage 30. The other ends of the brake arms 80 and 81 are operatively connected by means of a bell crank 84 to the plunger of a brake solenoid 85 suitably mounted on a mounting bracket 86 fixedly secured to the carriage 30. The brake arms 80 and 81 are disposed about the brake drum 46 on the differential 44 and are provided on their opposing faces with brake shoes 87 and 88, respectively, of suitable antifriction material.

A plunger 90, operated by the brake solenoid 85, is normally urged to the right (as viewed in Fig. 4) by a compression spring 91 mounted thereupon, thereby normally urging the bell crank 84 in a clockwise direction to force the brake arms 80 and 81 together and pressing the brake shoes 87 and 88 into braking engagement with the brake drum 46 on the differential 44 so as to prevent the rotation of the rear drive wheels 33-33. When the brake solenoid 85 is energized, the plunger 90 is forced to the left to release the brake shoes 87 and 88 from engagement with the brake drum 46.

Positioned beneath the transverse opening 28 in the bottom of the hopper 22 is a feeder mechanism 92 (Fig. 4) including a rubber-surfaced feed roll 93 mounted rotatably between suitable supports depending from the carriage. The feed roll 93 extends transversely across the entire width of the opening 28 and is driven by means of a feed motor 94, mounted on the carriage, through a belt and pulley arrangement shown generally at 95 (Fig. 3). When the feed motor 94 is energized, it drives the feed roll 93 in a clockwise direction, as seen in Fig. 4, so as to cause the copper shot contained in the hopper 22 to issue therefrom and spill into a discharge spout 97 which directs the shot downwardly into the cells 10-10. The opening 28 is partly covered by a row of resilient comb teeth, one of which designated 98 is shown in Fig. 3, which form a part of a spring wire comb 99 cooperating with the feed roll 93 to insure a substantially uniform delivery of the copper shot from the hopper 22.

The details of the feeder mechanism 92 are described fully and claimed in my copending application Serial No. 326,231, filed December 16, 1952.

Mounted on the rear of the carriage 30 is a terminal box 102 (Fig. 2), which encloses certain portions of an electrical control circuit hereinafter to be described. Projecting from the top of the terminal box 102 is a trolley pole 104. The free end of the trolley pole 104 is provided with suitable brush contactors (not shown), which slidingly engage three phase bus bars (not shown), positioned within a feed rail 105 mounted above the series of electroplating cells 10-10, as the hopper car 20 moves along the rails 35-35. Conduits 107 and 109 carry various electrical leads from the terminal box 102 to other portions of the aforementioned control circuit, such as the solenoids 72 and 85 and motors 65 and 94.

Figure 5:
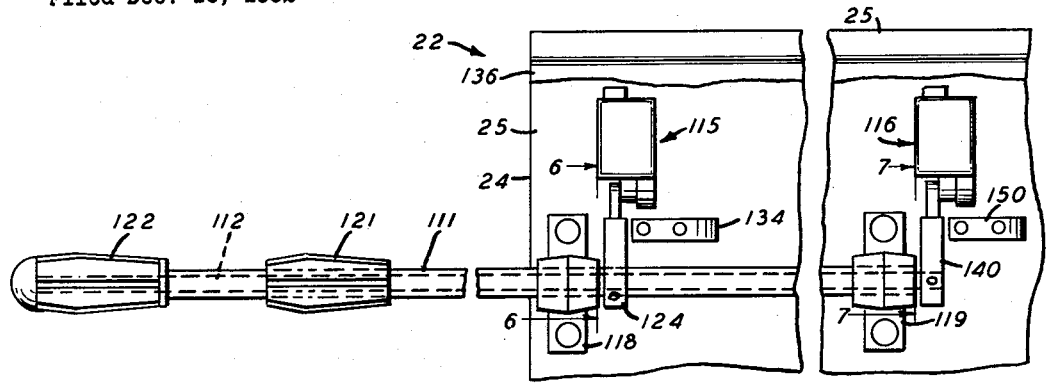
Fig. 5 is an enlarged, fragmentary view looking generally in the direction of line 5—5 of Fig. 2, of manually operated means for controlling the operation of the apparatus.

Referring now to Fig. 5 of the drawing, the carriage motor 65 and the feed motor 94 are controlled manually and independently of each other by means of two concentric shafts 111 and 112, respectively, which may be selectively engaged and operated to control switches 115 and 116 mounted on the front wall 25 of the hopper 22. The outer shaft 111 is cylindrical in shape and is designed to rotatably receive the solid inner shaft 112, with both ends of the inner shaft 112 projecting beyond the outer shaft 111. A pair of spaced pillow blocks 118 and 119 are secured to the front wall 25 below the switches 115 and 116, respectively, for slidably and rotatably mounting the outer shaft 111. The outer ends of the shafts 111 and 112 project laterally beyond the left side wall 24 of the hopper 22 (as viewed in Fig. 5), and are provided with suitable rubber handgrips 121 and 122, respectively.

Figure 6:
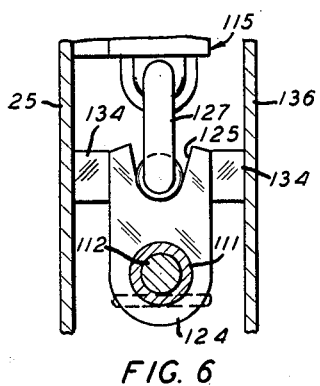
Fig. 6 is an enlarged, fragmentary section taken along line 6—6 of Fig. 5.

Fixedly mounted on the outer shaft 111, for angular movement therewith, is a cam 124 having a notch 125 (Fig. 5) provided in the free end thereof, which is designed for selective engagement with a pivoted, roller-type actuator 127 on the switch 115. The switch 115, like the switch 116, is a standard "neutral position" switch having resilient means (not shown) provided therein for normally biasing the actuator 127 to a neutral position, as shown in Fig. 6, wherein its associated contacts 130 and 131 (Fig. 8) are open.

When the outer shaft 111 is moved to an extreme left-hand position, as shown in Fig. 5, the cam 124 is positioned immediately adjacent to the pillow block 118, and the actuator 127 is engaged within the notch 125. With the actuator 127 and cam 124 so engaged, angular movement of the actuator may be effected by turning the outer shaft 111 in the desired direction. When the shaft 111 is turned manually in a clockwise direction, the actuator 127 (Fig. 6) is moved counterclockwise to a position wherein the contact 130 is closed, with the contact 131 remaining open. Upon release of the shaft 111, the resilient means forming a part of the switch 115 urges the actuator 127, the cam 124 and the shaft back into the "neutral position" (as shown in Fig. 6). In a similar manner, by turning the shaft 111 manually in a counterclockwise direction, the contact 131 may be closed, with the contact 130 remaining open.

To disengage the cam 124 from the actuator 127, the shaft 111 is slidably moved to the right (as viewed in Fig. 5) between the opposing faces of spaced wedge-shaped guides 134—134 (Fig. 6) positioned immediately adjacent to and to the right of the actuator 127. One of the guides 134—134 is mounted on the front wall 25 and the other is mounted in complementary relation thereto on the inner wall of a cover piece 136 (Fig. 6). The guides 134—134 are provided for the purpose of aligning the cam 124 vertically for proper engagement with the actuator 127 when the shaft 111 is again moved to the left.

The inner shaft 112 is provided at its right end, as viewed in Fig. 5, with a cam 140 having a notch 141 (Fig. 7) formed therein. The cam 140 is similar to the cam 124 and is operable, in a manner similar to that previously described in connection with the cam 124, by means of the shaft 112, to selectively control an actuator 144 on the switch 116, which in turn operates normally open contacts 145 and 146 associated therewith (Fig. 8). The cam 140 is in engagement with the actuator 144 whenever the shaft 111 and the shaft 112, slidable therewith, are in the extreme left-hand position (Fig. 5), wherein the cam is positioned immediately adjacent to the pillow block 119. Assuming that the actuator 144 is in engagement within the notch 141 of the cam 140, a clockwise angular movement of the shaft 112 from the neutral position will result in a closing of the contact 145, whereas a movement of the shaft 112 in the opposite direction from the "neutral position" will close the contact 146. Guides 150—150 are positioned adjacent to and to the right of the actuator 144 and are mounted in a manner similar to the guides 134—134. The guides 150—150 cooperate to insure the proper vertical alignment of the cam 140 prior to engagement with the actuator 144.

Figure 7:
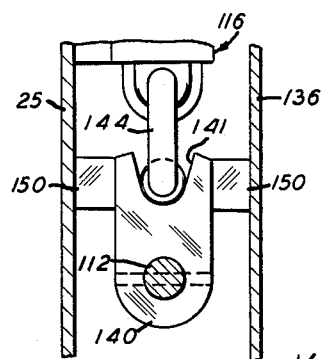
Fig. 7 is an enlarged, fragmentary section taken along line 7—7 of Fig. 5.
Figure 8:
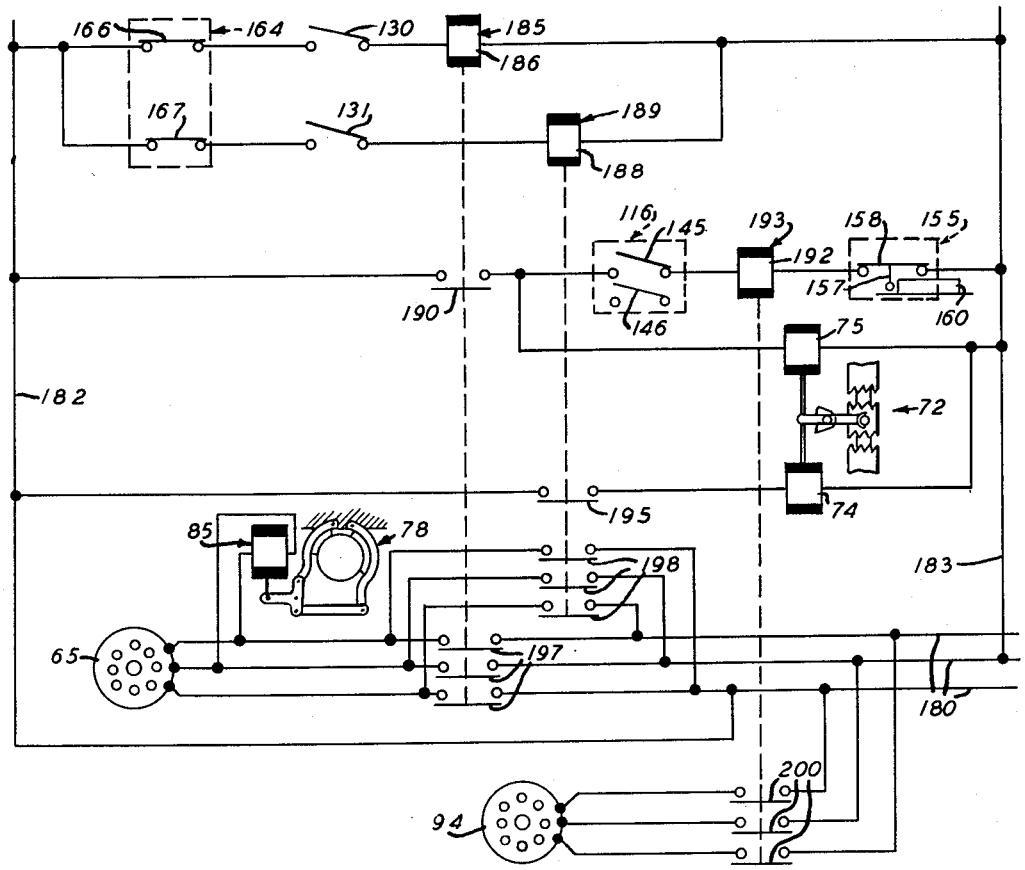
Fig. 8 is a schematic diagram of an electrical control circuit associated with the apparatus.

When the shafts 111 and 112 are moved to an extreme right-hand position, the cam 140 becomes disengaged from the actuator 144 and passes between the opposed faces of the guides 150—150 (Figs. 5 and 7). To reengage the cam 140 with the actuator 144, the shaft 112 is moved to an extreme left-hand position. As the cam 140 moves with the shaft 112 to this position, the guides 150—150 serve to hold the cam 140 in vertical alignment thereby permitting the notch 141 to receive the actuator 144.

Referring to Fig. 3, a switch 155, having a roller-type, spring-biased actuator 157 depending therefrom, is mounted near the right end of the beam 37. The actuator 157 controls a normally closed contact 158 (Fig. 8) and is designed to be operated by a series of cams 160—160 spaced along the inner edge of the rail 35. The cams 160—160 are positioned so that the actuator 157 is operated to open the contact 158 whenever the spout 97 of the hopper 22 is not positioned above one of the cells 10—10, thereby preventing the discharge of copper shot therefrom. When the actuator 157 is not in engagement with one of the cams 160—160, resilient means (not shown) within the switch 155 urges the actuator 157 into its normal position wherein the associated contact 158 is closed.

Similarly mounted on the opposite end of the axle 37 is a standard neutral position switch 164 (Fig. 3) having a roller-type, spring-biased, pivoted actuator 165 depending therefrom which controls normally closed contacts 166 and 167 (Fig. 8). The actuator 165 is designed to be operated by two cams 170 and 171 (Fig. 1) positioned on the rail 34 at opposite ends of the series of cells 10—10. When the actuator 165 strikes the cam 170, it is pivoted to open the contact 166, the contact 167 remaining closed. The cam 170, positioned at the opposite end of the series of cells 10—10, pivots the actuator 165 in the reverse direction to open contact 167, with the contact 166 remaining open.

The electrical circuit for operating and controlling the hopper car 20 and the feeder mechanism 92 is shown schematically in Fig. 8. Electrical power for energizing the circuit is obtained from a three-phase power supply via three-phase power lines 180—180 connected to the brushes on the trolley pole. Bus lines 182 and 183 are connected to two of the power lines 180—180 to provide a single phase supply for certain elements of the control circuit.

A solenoid-operated relay 185 has its operating coil 186 connected across the bus lines 182 and 183 in series with the normally closed contact 166 of the switch 164 and the normally open contact 130 of the switch 115. Shunting the series arrangement of the coil 186, contact 130 and contact 166 is an operating coil 188 of a solenoid-operated relay 189 connected in series with the normally closed contact 167 of the switch 164 and the normally open contact 131 of the switch 115. The relay 185 is provided with a normally open contact 190 connected in series with an operating coil 192 of another solenoid-operated relay 193, the normally closed contact 158 of the switch 155 and the normally open contact 145 of the switch 116 across the bus lines 182 and 183. The series arrangement of the contact 158, the coil 192 and the contact 145 is shunted by a circuit containing the push coil 75 of the clutch solenoid 72. The pull coil 74 of the clutch solenoid 72 is connected in series with a normally open contact 195 of the relay 189 across the bus lines 182 and 183.

The reversible carriage motor 65 is arranged so as to be selectively connected to the power lines 180—180 through either normally open contacts 197—197 of the relay 185 or normally open contacts 198—198 of the relay 189. When the contacts 197—197 are closed, the motor operates to drive the hopper car 20 in the forward direction, whereas when the contacts 198—198 are closed, the motor operates to drive the hopper car in the reverse direction.

Connected across two of the input terminals of the carriage motor 65, is the brake solenoid 85. Whenever the motor 65 is energized, the brake solenoid 85 is likewise energized to disengage the brake shoes 87 and 88 from pressing engagement with the brake drum 46 on the differential 44. The feed motor 94 is connected to the three-phase power lines 180—180 through normally open contacts 200—200 of the relay 193.

*Operation*

In operation, the hopper car 20 is manually controlled by an operator who walks beside the car with the handgrip 121 on the shaft 111 grasped in one hand, and the handgrip 122 on the shaft 112 grasped in his other hand. For the purposes of this description, it will be assumed that the hopper 22 is filled with copper shot and that it is positioned at the extreme left end (as viewed in Fig. 1) of the series of cells 10—10. With the hopper car 10 in this position, the actuator 165 of the switch 164 is in contact with the cam 170 and pivoted to open the contact 167, the contact 166 remaining closed. The open contact 167 prevents the energization of the relay 189, which operates the reverse contacts 198—198. Hence, in this position it is impossible to operate the hopper car 20 from right to left, as viewed in Fig. 1. It is also impossible at this position to energize the feed motor 94, since the actuator 157 of the switch 155 is in contact with one of the cams 160—160 which opens the contact 158.

Assuming that the shaft 111 and the shaft 112 are in the extreme left-hand position with the cams 124 and 170 engaging the actuators 127 and 144, respectively, the hopper car 20 may be operated in the forward (or right hand) direction by turning the shaft 111 in a clockwise direction, as viewed in Fig. 6, thereby closing the contact 130 of the switch 115 to energize the relay 185, which in turn closes the forward contacts 197—197 and contact 190. The closing of the contact 190 energizes the "push" coil 75 of the clutch solenoid 72, thereby operatively connecting the drive sprocket 53 to the carriage motor 65 which in turn is energized through contacts 197—197 to drive the hopper car 30 forward. Simultaneously with the energization of the carriage motor 65, the brake solenoid 85 is energized to disengage the brake shoes 87 and 88 from the brake drum 46 mounted on the outer periphery of the differential 44.

To selectively feed and distribute the copper shot to the cells 10—10 while the hopper car 20 is moving toward the right, the operator operates the contact 145 of the switch 116 by turning the shaft 112 in a clockwise direction. Assuming that the carriage motor 65 is energized and driving the hopper car in the forward direction and that the contact 158 of the switch 155 is closed, the closing of the contact 145 of the switch 116 will energize the operating coil 192 of the relay 193 to close its associated contacts 200—200, and energize the feed motor 94. When the feed motor 94 is energized, the feed roll 93 is driven in a clockwise direction (Fig. 3) to cause the copper shot to issue from the hopper 22 at a substantially uniform rate through the discharge spout 97. Since the carriage is moving forward at a constant speed, a substantially uniform distribution of the copper shot upon the copper anode plate 16 is obtained. The operation of the feed motor 65 is automatically terminated each time the actuator 157 on the switch 155 strikes one of the cams 160—160 to open the contact 158. This action prevents the copper shot from being deposited in places other than the cells 10—10.

If the operator should release the handgrip 121 on the shaft 111 while the feed motor 94 is energized, the switch 115 will resume its neutral position wherein the contact 130 is open, thereby preventing the operation of the relay 185, which in turn causes the contact 190 and the contacts 197—197 to open. When the contact 190 and the contacts 197—197 are open, the carriage motor 65 and the feed motor 94 are simultaneously de-energized and the hopper car 20 is braked to an immediate stop by the de-energization of the brake solenoid 85.

When the hopper car reaches the extreme right end (as viewed in Fig. 1) of the series of cells 10—10, the actuator 165 of the switch 164 strikes the cam 171 to open the contact 166, with the contact 167 remaining closed. When the contact 166 is open, it is impossible to operate the feed motor 94 since the relay 185 is de-energized and its contact 190 is open, thereby preventing the operation of the relay 193 to close the contacts 200—200. The only direction in which the hopper car 20 may be operated when the contact 166 is open, is the reverse direction.

The operator may cause the hopper car 20 to move in the reverse direction toward its initial position by rotating the shaft 111 counterclockwise to close the contact 131 of the switch 115, thereby energizing the relay 189 through the closed contact 167. When the relay 189 is energized, the contact 195 and the reverse contacts 198—198 are closed. The closing of the contact 195 energizes the pull coil 74 of the clutch solenoid 72 to operatively connect the drive sprocket 54 to the carriage motor 65, which is energized simultaneously therewith through the contacts 198—198 to drive the hopper car 20 in the reverse direction. Simultaneously with the energization of the carriage motor 65, the brake solenoid 85 is energized to disengage the brake shoes 87 and 88 from the brake drum 46. Since the drive sprocket 54 is now operatively connected with the carriage motor 65, the speed of the hopper car in the reverse direction will be three times as great as the speed thereof in the forward direction. When the hopper car 20 is moving in the reverse direction, the feed motor 94 cannot be operated, since the contact 190 is open and the relay 193 is de-energized. Hence, the feed roll 93 will not operate whether or not the operator manipulates the handgrip 122.

When it is no longer desired to operate the hopper car 20, the shafts 111 and 112 may be retracted by moving them to the extreme right-hand position (as viewed in Fig. 5), whereby they are effectively disengaged from the actuators of the switches 115 and 116, respectively.

It will be understood that the operator selectively controls the feeding and distribution of the copper shot to the various cells 10—10 by means of the shaft 112. Hence, one or more of the cells 10—10 may be skipped when there is no need for a replenishment of the copper shot forming the layer 17 by releasing the handgrip 122 and allowing the switch 116 to assume its "neutral position."

It is manifest that various modifications of the heretofore described embodiment of the invention may be made within the spirit and scope thereof. It is also obvious that apparatus embodying the invention may be used to convey and distribute granular materials other than copper shot.

What is claimed is:

1. Material handling apparatus for distributing granular material over a given path, which comprises a mobile hopper movable along said path, said hopper having an opening in the bottom thereof, a material distributor positioned across the opening in the hopper and operable to discharge granular material from the hopper at a substantially uniform rate, a reversible motor for driving the mobile hopper in either direction along the path, a switch for selectively energizing the reversible motor, said switch being operable to a position wherein the hopper is driven in one direction along said path or a second position wherein the hopper is driven in the other direction, a second switch for operating the distributor, a manually operable, hollow, outer shaft rotatably and slidably mounted on the hopper and projecting therefrom, a manually operable inner shaft rotatably mounted within the outer shaft and slidable therewith, said inner shaft extending beyond the outer shaft at either end, a cam fixedly mounted on one of the shafts and movable axially therewith for selective engagement with the reversible motor switch, said cam when in engagement with said reversible motor switch being angularly movable by means of its associated shaft for selective operation thereof, and a second cam fixedly mounted on the other shaft and movable axially therewith for selective engagement with the distributor switch, said cam being angularly movable by means of its associated shaft for selective operation of said distributor switch.

2. Material handling apparatus for distributing granular material over a given path, which comprises a mobile hopper movable along said path, said hopper having an opening in the bottom thereof, a rotary distributor positioned across the opening in the hopper and operable to discharge granular material from the hopper at a substantially uniform rate, a reversible motor for driving the mobile hopper in either direction along the path, a switch for selectively energizing the reversible motor, said switch being resiliently biased to a neutral position and operable to either a position wherein the hopper is driven in a forward direction along said path or second position wherein the hopper is driven in the reverse direction, a second switch for operating the rotary distributor, a manually operable, hollow, outer shaft rotatably and slidably mounted on the hopper and projecting therefrom, a manually operable inner shaft rotatably mounted within the outer shaft and slidable therewith, said inner shaft extending beyond the outer shaft at either end, a cam fixedly mounted on one of the shafts and movable axially therewith for selective engagement with the reversible motor switch, said cam when in engagement with the reversible motor switch being angularly movable by means of its associated shaft for selective operation of said reversible motor switch, and a second cam fixedly mounted on the other shaft for selective engagement with the rotary distributor switch, said cam being angularly movable by means of its associated shaft for selective operation of said distributor switch.

3. Material handling apparatus for distributing granular anode materials to a series of spaced, individual, electroplating cells, which comprises a pair of spaced rails mounted above and to either side of the series of cells, a mobile hopper movable along said rails over the cells, said hopper having an opening in the bottom thereof, a material distributor positioned across the opening in the hopper, a motor for operating the distributor to discharge an anode material contained within the hopper at a substantially uniform rate into the individual cells, a reversible motor for driving the mobile hopper in either direction along the rails, a manually operable, hollow, outer shaft rotatably mounted on the hopper and projecting laterally therefrom, a manually operable inner shaft mounted rotatably within the outer shaft, means operatively connected to one of the shafts and selectively actuatable thereby to energize the reversible motor to drive the hopper in a selected direction along the rails, means operatively connected to the other shaft and normally selectively actuatable thereby to energize the distributor operating motor, and means operable independently of the manually operable shafts for preventing the operation of the material distributor whenever the hopper is not properly positioned over one of the cells.

4. Material handling apparatus for distributing granular anode materials to a series of spaced, individual, electroplating cells, which comprises a pair of spaced rails mounted above and to either side of the series of cells, a mobile hopper movable along said rails over the cells, said hopper having an opening in the bottom thereof, a rotary distributor positioned across the opening in the hopper, a motor for operating the rotary distributor to discharge anode material contained within the hopper at a substantially uniform rate into the individual cells, a reversible motor for driving the mobile hopper in either direction along the rails, a manually operable, hollow, outer shaft rotatably mounted on the hopper and projecting laterally therefrom, a manually operable inner shaft mounted rotatably within the outer shaft, means operatively connected to one of the shafts and selectively actuatable thereby to energize the reversible motor to drive the hopper in a selected direction along the rails, means operatively connected to the other shaft and normally selectively actuatable thereby to energize the distributor operating motor, a limit switch mounted on the mobile hopper, and a plurality of projecting limit cams spacedly mounted along the rails for engaging and operating the limit switch to de-energize the distributor operating motor independently of the manually operable shafts whenever the opening in the hopper is not positioned directly over one of the cells.

5. Material handling apparatus for distributing granular material over a given path, which comprises a mobile hopper movable along said path, said hopper having an opening in the bottom thereof, a material distributor positioned across the opening in the hopper and operable to discharge granular material from the hopper at a substantially uniform rate, a reversible motor for driving the mobile hopper in either direction along the path, a switch for energizing the reversible motor, a pivoted actuator associated with said switch, said actuator being angularly movable from a normal neutral position wherein the reversible motor is de-energized to either a position wherein the hopper is driven in a forward direction along said path or a second position wherein the hopper is driven in the reverse direction, a second switch for controlling the operation of the distributor, a pivoted actuator associated with said second switch and angularly movable from a normal neutral position wherein the distributor is inoperative to a position wherein said distributor is operated, a manually operable, hollow, outer shaft rotatably and slidably mounted on the hopper and projecting therefrom, a manually operable inner shaft rotatably mounted within the outer shaft and slidable therewith, said inner shaft extending therebeyond the outer shaft at either end, a cam fixedly mounted on one of said shafts and movable axially therewith for selective engagement with the actuator associated with reversible motor switch, said cam when in engagement with the actuator associated with the reversible motor switch being angularly movable by means of its associated shaft for selective operation of the reversible motor, and a second cam fixedly mounted on the other shaft for selective engagement with the actuator associated with distributor switch, said second cam being angularly movable by means of its associated shaft for selective operation of said rotary distributor.

References Cited in the file of this patent

FOREIGN PATENTS

| | | |
|---|---|---|
| 50,939 | Sweden | Jan. 4, 1917 |
| 503,698 | Germany | July 25, 1930 |